(12) United States Patent
Matsuda et al.

(10) Patent No.: US 12,467,198 B2
(45) Date of Patent: Nov. 11, 2025

(54) COLOR HAZING OR DECOLORING AGENT AND METHOD OF PRODUCING FABRIC

(71) Applicants: Nicca Chemical Co., Ltd., Fukui (JP); Elephantech Inc., Tokyo (JP)

(72) Inventors: Mitsuo Matsuda, Fukui (JP); Miyako Nakayama, Fukui (JP); Masaaki Sugimoto, Tokyo (JP)

(73) Assignees: Nicca Chemical Co., Ltd., Fukui (JP); Elephantech Inc., Tokyo (JP)

( * ) Notice: Subject to any disclaimer, the term of this patent is extended or adjusted under 35 U.S.C. 154(b) by 188 days.

(21) Appl. No.: 18/546,605

(22) PCT Filed: Feb. 16, 2022

(86) PCT No.: PCT/JP2022/006261
§ 371 (c)(1),
(2) Date: Aug. 16, 2023

(87) PCT Pub. No.: WO2022/176930
PCT Pub. Date: Aug. 25, 2022

(65) Prior Publication Data
US 2024/0133116 A1 Apr. 25, 2024
US 2024/0229349 A9 Jul. 11, 2024

(30) Foreign Application Priority Data

Feb. 18, 2021 (JP) ................. 2021-024375

(51) Int. Cl.
*D06P 5/13* (2006.01)
*D06P 1/16* (2006.01)
(Continued)

(52) U.S. Cl.
CPC ............... *D06P 5/137* (2013.01); *D06P 1/16* (2013.01); *D06P 1/65118* (2013.01);
(Continued)

(58) Field of Classification Search
None
See application file for complete search history.

(56) References Cited

U.S. PATENT DOCUMENTS 4,137,393 A  1/1979  Sidebotham et al.
2020/0041359 A1*  2/2020  Aida .................... C09B 9/00

FOREIGN PATENT DOCUMENTS

JP  S53-126079  11/1978
JP  S55-12851  1/1980
(Continued)

OTHER PUBLICATIONS

Translation of Morimoto (JP 2010-163475 A); year: 2010.*
(Continued)

*Primary Examiner* — Katie L. Hammer
(74) *Attorney, Agent, or Firm* — DLA Piper LLP (US)

(57) ABSTRACT

A color hazing or decoloring agent including at least one compound selected from compounds represented by formula (1) and compounds represented by formula (2), and used for color hazing or decoloring of a fabric printed or dyed with a disperse dye:

$$R^1OOC-X-COOR^2 \quad (1)$$
$$Y^1O\text{-}(AO)_n-Y^2 \quad (2)$$

wherein, in formula (1), X is an alkylene or alkenylene group of 2 to 4 carbon atoms, $R^1$ is an alkyl group of 1 to 4 carbon atoms and $R^2$ is an alkyl group of 1 to 4 carbon atoms, and in formula (2), AO is an alkyleneoxy group of 2 to 3 carbon atoms, n is an integer of 1 to 3, $Y^1$ is a hydrogen atom or an $R^3CO$ group, $R^3$ is an alkyl group of 1 to 4 carbon atoms, $Y^2$ is a hydrogen atom or an $R^4CO$ group, and $R^4$ is an alkyl group of 1 to 4 carbon atoms.

15 Claims, 2 Drawing Sheets

Grade 5   Grade 4   Grade 3   Grade 2   Grade 1   Grade 0

(original pattern)

(51) Int. Cl.
  *D06P 1/651* (2006.01)
  *D06P 3/54* (2006.01)
  *D06P 5/15* (2006.01)
  *D06P 5/20* (2006.01)

(52) U.S. Cl.
  CPC ...... *D06P 1/65125* (2013.01); *D06P 1/65131* (2013.01); *D06P 3/54* (2013.01); *D06P 5/13* (2013.01); *D06P 5/15* (2013.01); *D06P 5/158* (2013.01); *D06P 5/2077* (2013.01)

(56) References Cited

FOREIGN PATENT DOCUMENTS

| | | |
|---|---|---|
| JP | S60-199990 | 10/1985 |
| JP | 2005-103762 | 4/2005 |
| JP | 2005-126861 | 5/2005 |
| JP | 2007-191839 | 8/2007 |
| JP | 2007-224128 | 9/2007 |
| JP | 2007-231432 | 9/2007 |
| JP | 2009-68127 | 4/2009 |
| JP | 2010-144073 | 7/2010 |
| JP | 2010-163475 | 7/2010 |
| JP | 2010163475 A * | 7/2010 |

OTHER PUBLICATIONS

Extended European Search Report dated Dec. 17, 2024, from counterpart European Application No. 22756248.5.

International Search Report dated Apr. 20, 2022, in counterpart PCT/JP2022/006261, 2 pages, along with an English translation.

\* cited by examiner

Before decoloring　　　　After decoloring

COLOR HAZING OR DECOLORING AGENT AND METHOD OF PRODUCING FABRIC

FIELD

This application discloses a color hazing or decoloring agent and a method for producing a fabric.

BACKGROUND

Recently, fabrics that are printed or stained by disperse dyes (for example, fabrics for displays used for advertisement or event promotion) are increasingly required to have added value and to be reutilizable. For example, patterns and logos or text formed on fabrics by sublimation transfer or block printing may be hazed or erased to make trademarks or copyrights illegible to avoid infringement, thus facilitating upcycling. Or by changing patterns, logos or information printed on fabrics in the case of cancellation or postponement of events, the fabrics can thus be reused.

Techniques for discharge dyeing for removal of dyes from printed or stained fabrics are known, as disclosed in Japanese Unexamined Patent Publication Nos. S53-126079, 2010-163475, 2005-103762, 2007-191839, 2007-224128, 2007-231432, S55-12851 and 2009-68127. For example, a discharge dyeing paste comprising a reducing agent such as stannous chloride or an alkali compound may be printed on an under-dyed fabric, and heat may be applied by steaming to decompose the dye only on the coated sections, after which the decomposed dye and sizing agent may be removed by soaping. The print method in this case may be block printing, but it may also be one using an ink-jet apparatus. In some cases an aromatic solvent, so called "carrier agent", is used as an auxiliary agent during discharge dyeing.

It is possible to remove dyes from fabrics by known techniques. However, it has been difficult to transfer dyes adhered to the fabrics without causing them to decompose, and to cause color hazing or decoloring or altering of the patterns formed by dyeing onto fabrics.

SUMMARY

We thus provide:
a color hazing or decoloring agent
including at least one compound selected from the group consisting of compounds represented by general formula (1) and compounds represented by general formula (2), and
used for color hazing or decoloring of a fabric printed or dyed with a disperse dye

  (1)

  (2).

In general formula (1), X is an alkylene or alkenylene group of 2 to 4 carbon atoms, $R^1$ is an alkyl group of 1 to 4 carbon atoms and $R^2$ is an alkyl group of 1 to 4 carbon atoms, and in general formula (2), AO is an alkyleneoxy group of 2 to 3 carbon atoms, n is an integer of 1 to 3, $Y^1$ is a hydrogen atom or an $R^3CO$ group, $R^3$ is an alkyl group of 1 to 4 carbon atoms, $Y^2$ is a hydrogen atom or an $R^4CO$ group, and $R^4$ is an alkyl group of 1 to 4 carbon atoms.

In the color hazing or decoloring agent of the present disclosure, the compounds represented by general formula (2) may be one or more compounds selected from the group consisting of compounds represented by general formula (2-1) and compounds represented by general formula (2-2)

  (2-1)

  (2-2).

In general formula (2-1), EO is an ethyleneoxy group, and in general formula (2-2), PO is a propyleneoxy group.

In the color hazing or decoloring agent of the present disclosure, $R^1$ may be an alkyl group of 1 or 2 carbon atoms, and $R^2$ may be an alkyl group of 1 or 2 carbon atoms.

In the color hazing or decoloring agent of the present disclosure, X may be an alkylene group of 2 to 4 carbon atoms.

We also provide:
a method of producing a fabric, the method including:
carrying out color hazing or decoloring of a fabric printed or dyed with a disperse dye, by heating the fabric while contacting with a color hazing or decoloring agent.

We thus allow dye adhering to a fabric to be transferred and then refixed onto the fabric, or allow dye adhering to a fabric to be transferred and then refixed onto another material. It is thus possible to easily color haze or decolor, or to alter patterns that have been formed in fabrics using dyes.

DETAILED DESCRIPTION

1. Color Hazing or Decoloring Agent

Figure 1:
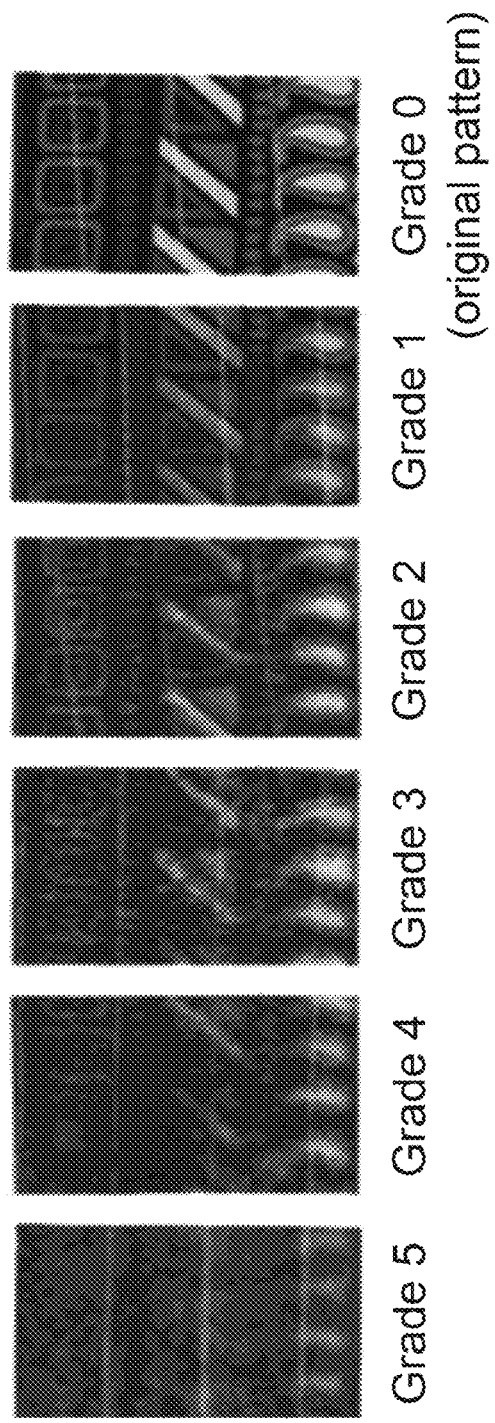
FIG. 1 shows an example of a scale for assessing the degree of color hazing effect.

The term "color hazing" means that, for a fabric that has been printed or dyed with a disperse dye, the disperse dye is refixed after having been transferred to disrupt the pattern formed in the fabric by the disperse dye. For a plain (solid color) fabric that has been dyed with a disperse dye, the process of forming a pattern in the fabric by transferring and then fixing only part of the disperse dye is still categorized as "color hazing". The term "decoloring" refers to removing a disperse dye from a fabric that has been printed or dyed with a disperse dye. Our agent may be used as a color hazing agent, as a decoloring agent, or as both a color hazing agent and a decoloring agent. Our agent will now be explained for application in general as a "color hazing or decoloring agent".

Our color hazing or decoloring agent includes at least one compound selected from the group consisting of compounds represented by general formula (1) and compounds represented by general formula (2), and is used for color hazing or decoloring of a fabric printed or dyed with a disperse dye

  (1)

  (2).

1.1 Compounds Represented by General Formula (1)

In general formula (1), X is an alkylene or alkenylene group of 2 to 4 carbon atoms. Particularly when X is an alkylene group of 2 to 4 carbon atoms, a higher color hazing or decoloring effect will be more easily exhibited while inhibiting damage such as shrinkage of the fabric. Group X may be a straight-chain alkylene or alkenylene group, or a branched alkylene or alkenylene group. When X is an alkenylene group of 2 to 4 carbon atoms, the alkenylene group is preferably a vinylene group, and the compound represented by general formula (1) may be either the cis-form or trans-form, but a higher color hazing or decoloring effect will tend to be exhibited with a cis-form compound (such as a maleic acid diester).

In general formula (1), $R^1$ is an alkyl group of 1 to 4 carbon atoms and $R^2$ is an alkyl group of 1 to 4 carbon atoms. When $R^1$ is an alkyl group of 1 or 2 carbon atoms and $R^2$ is an alkyl group of 1 or 2 carbon atoms, a higher color hazing or decoloring effect will tend to be exhibited and washing removal after color hazing or decoloring will be facilitated. $R^1$ and $R^2$ may be the same alkyl group, or they may be different alkyl groups. $R^1$ and $R^2$ may be straight-chain alkyl groups or branched alkyl groups.

A compounds represented by general formula (1) have a chemical structure corresponding to a dibasic acid diester. Specific examples of compounds having such a chemical structure include dimethyl succinate, diethyl succinate, dimethyl glutarate, diethyl glutarate, dimethyl adipate, diethyl adipate, dimethyl maleate and diethyl maleate. An even higher color hazing or decoloring effect will be exhibited if the compound represented by general formula (1) is one or more types selected from among dimethyl succinate, dimethyl glutarate and dimethyl adipate.

1.2 Compounds Represented by General Formula (2)

In general formula (2), AO is an alkyleneoxy group of 2 to 3 carbon atoms.

Specifically, it may be an ethyleneoxy group or a propyleneoxy group, or a combination of both.

In general formula (2), n is an integer of 1 to 3. A higher color hazing or decoloring effect will tend to be exhibited with a smaller value of n. From this viewpoint, n may be 1 or 2.

In general formula (2), $Y^1$ is a hydrogen atom or an $R^3CO$ group, $R^3$ is an alkyl group of 1 to 4 carbon atoms, $Y^2$ is a hydrogen atom or an $R^4CO$ group, and $R^4$ is an alkyl group of 1 to 4 carbon atoms. When $Y^1$ and $Y^2$ are an $R^3CO$ group and $R^4CO$ group, respectively, with $R^3$ being an alkyl group of 1 or 2 carbon atoms and $R^4$ being an alkyl group of 1 or 2 carbon atoms, a higher color hazing or decoloring effect will tend to be exhibited. $Y^1$ and $Y^2$ may be the same group or different groups. $R^3$ and $R^4$ may also be the same group or different groups.

When the compound represented by general formula (2) is one or more compounds selected from the group consisting of compounds represented by general formula (2-1) and compounds represented by general formula (2-2) below, a higher color hazing or decoloring effect will tend to be exhibited. For general formulas (2-1) and (2-2), $R^3$, $Y^2$ and n are the same as described above

$$R^3COO\text{-}(EO)_n\text{—}Y^2 \quad (2\text{-}1)$$

$$HO\text{-}(PO)_n\text{—}H \quad (2\text{-}2).$$

In general formula (2-1), EO is an ethyleneoxy group, and in general formula (2-2), PO is a propyleneoxy group.

The compounds represented by general formula (2) have a chemical structure corresponding to a diol, a diol monoacetate (monoester) or a diol diacetate (diester). Specific examples of compounds having such a chemical structure include ethyleneglycol diacetate, di- or triethyleneglycol diacetate, ethyleneglycol monoacetate, di- or triethyleneglycol monoacetate, propyleneglycol diacetate, di- or tripropyleneglycol diacetate, propyleneglycol monoacetate, di- or tripropyleneglycol monoacetate, ethylene glycol, propylene glycol, di- or triethylene glycol and di- or tripropylene glycol. An even higher color hazing or decoloring effect will be exhibited if the compound represented by general formula (2) is one or more types selected from among ethyleneglycol diacetate, diethyleneglycol diacetate, ethyleneglycol monoacetate and propylene glycol.

One or more compounds from among compounds represented by general formula (1) or compounds represented by general formula (2) may be selected for use in the color hazing or decoloring agent. The color hazing or decoloring agent may be composed entirely of a compound represented by formula (1) or (2), or it may also include other components in addition to those compounds. The contents of other components in the color hazing or decoloring agent are not particularly restricted. The color hazing or decoloring agent can exhibit the desired color hazing or decoloring effect with either a high or low concentration of a compound of formula (1) or (2).

1.3 Other Components

Specific examples of compounds other than compounds represented by formula (1) or (2) include water and other additives.

Water functions to aid in spread of the color hazing or decoloring agent throughout the fabric when the color hazing or decoloring agent has been contacted with the fabric. The content of water in the color hazing or decoloring agent is not particularly restricted. For example, the content of water in the color hazing or decoloring agent may be 5 mass % or lower. Alternatively, as described below, the fabric may be wetted with water beforehand, separate from the color hazing or decoloring agent.

1.4 Uses

The color hazing or decoloring agent may be used for color hazing or decoloring of a fabric that has been printed or dyed with a disperse dye. The printing and dyeing may be carried out by any desired means. Specific examples of fabrics printed with disperse dyes include block printed fabrics, ink jet printed fabrics and sublimation transfer fabrics. The fabric may have a pattern or characters formed by a disperse dye, or it may be a plain (solid color) fabric printed or dyed with a disperse dye.

1.4.1 Disperse Dye

There are no particular restrictions on the type of disperse dye. Examples of disperse dyes include compounds classified as C.I. Disperse Black, compounds classified as C.I. Disperse Blue, compounds classified as C.I. Disperse Red, compounds classified as C.I. Disperse Orange, compounds classified as C.I. Disperse Yellow, compounds classified as C.I. Disperse Green, compounds classified as C.I. Disperse Violet and compounds classified as C.I. Disperse Brown. The amount of disperse dye adhered to the fabric is not particularly restricted. The disperse dye may be printed or dyed in the form of a block printing ink or sublimation transfer ink containing it.

1.4.2 Fabric Type

There are no particular restrictions on the type of fabric. Fibers to be printed or dyed with the disperse dye include polyester fibers, acetate fibers, polylactic acid fibers, polyphenylene sulfide fibers, vinylon fibers, polyamide fibers, polypropylene fibers and polyurethane fibers. With a fabric containing polyester fibers, it will be easier to exhibit the high color hazing or decoloring effect of the color hazing or decoloring agent of the present disclosure. The fabric may comprise multiple types of fibers (by mix spinning, yarn doubling, union weaving or mixed knitting, for example), or it may consist of a single type of fiber. If the fibers comprises multiple types of fibers, the multiple types of fibers may be selected from among the fibers mentioned as fibers to be printed or dyed by the aforementioned disperse dyes, or they may be the fibers mentioned above in combination with different types of fibers. The fabric may be a knitted fabric, or a woven fabric, or a nonwoven fabric.

2. Method of Producing Fabric

We also provide a method of producing fabric products by using the aforementioned color hazing or decoloring agent for color hazing or decoloring of fabrics that have been printed or dyed with disperse dyes.

The method of producing a fabric includes carrying out color hazing or decoloring of a fabric printed or dyed with a disperse dye, by heating the fabric while contacting with a color hazing or decoloring agent.

2.1 Contact

The method of contacting the color hazing or decoloring agent with the fabric is not particularly restricted. For example, the fabric may be immersed in the color hazing or decoloring agent and then removed and squeezed the fabric, or the color hazing or decoloring agent may be printed, coated or sprayed onto the fabric. More specifically, the color hazing or decoloring agent may be dropped (optionally by ink-jet) onto the fabric, or it may be brush coated, or padded. Alternatively, the fabric to be color hazed or decolored may be pressed against a material (such as paper or cloth) impregnated with the color hazing or decoloring agent.

The amount of color hazing or decoloring agent to be adhered to the fabric is not particularly restricted, and it may be adjusted as appropriate depending on the desired degree of color hazing or decoloring. For color hazing of a fabric, for example, the amount of color hazing agent at the section of the fabric to be color hazed may be 10% o.w.f. (mass %, on weight of fabric) to 200% o.w.f, preferably 10% o.w.f. to 50% o.w.f. and more preferably 10% o.w.f. to 20% o.w.f. For decoloring of a fabric, the amount of decoloring agent at the section of the fabric to be decolored may be 10% o.w.f. to 200% o.w.f, and preferably 50% o.w.f. to 150% o.w.f.

2.2 Heating

The heating may be carried out by known heating means. The heating means may be an iron, a hot plate, steaming, or dry heat treatment, for example. The heating temperature may be a temperature at which transfer of the disperse dye with the color hazing or decoloring agent takes place. The heating temperature may be 120° C. to 220° C. The lower limit for the heating temperature may be 120° C. or higher, or 150° C. or higher, and the upper limit may be 220° C. or lower, or 200° C. or lower. The heating time at the heating temperature may be determined as appropriate for the desired degree of color hazing or decoloring. The heating time at the aforementioned heating temperature may be 30 seconds to 10 minutes. The lower limit for the heating time at the aforementioned heating temperature may be 30 seconds or longer, or 1 minute or longer, and the upper limit may be 10 minutes or less, or 3 minutes or less.

2.3 Additional Steps

The method includes steps related to aforementioned contact and heating, and may include other steps in addition to these.

2.3.1 Pretreatment

In the method, the fabric may also be wetted beforehand with water, before contacting the fabric with the color hazing or decoloring agent. This helps control spread of the color hazing or decoloring agent in the fabric and aids in control of the hardness of the processed fabric. The amount of water added to the fabric is not particularly restricted.

2.3.2 Flow Control During Color Hazing or Decoloring

Flow of the liquid phase or gas phase in the fabric being hazed or decolored may be controlled during contact and heating. For example, flow of the liquid phase or gas phase in the fabric may be controlled by contacting an object with the fabric. The object may be one that is resistant to the color hazing or decoloring agent and that can withstand the heating. The material of the object is not particularly restricted and may be fabric or paper, or another material (metal, ceramic or plastic, for example). The form of the object is also not particularly restricted and may be a sheet, for example, or another form. The location of contact of the object with the fabric is likewise not particularly restricted, and for example, the fabric may be contacted with the object on one side, the other side, or on both the one side and the other side, to control flow of the liquid phase or gas phase in the fabric. When an object is contacted with the fabric, the heating means may be situated on the same side as the object, or it may be situated on the side opposite from the object.

2.3.3 Pressurization During Decoloring

We found that decoloring of a fabric using the color hazing or decoloring agent of the present disclosure is carried out even more effectively by applying pressure while contacting a patch cloth or similar with the fabric during decoloring. Specifically, when a fabric that has been printed or dyed with a disperse dye is heated while being contacted with the color hazing or decoloring agent of the present disclosure, an object such as a patch cloth or sheet to which the disperse dye can adhere may be contacted with the fabric while pressure is applied to the fabric, thus allowing the disperse dye to be easily transferred from the fabric to the object. As a result, the disperse dye can be efficiently removed from the fabric so that the amount of disperse dye remaining in the fabric after decoloring can be further reduced. When a fabric that has been printed or dyed with a disperse dye is heated while in contact with the color hazing or decoloring agent of the present disclosure, (1) the fabric may be contacted with an object such as a patch cloth or sheet to which the disperse dye can be adhered, and (2) pressure may be applied to the fabric so that (3) the amount of adhesion of the color hazing or decoloring agent on the fabric is 10% o.w.f. to 200% o.w.f. and preferably 50% o.w.f. to 150% o.w.f., for example, thereby further increasing the color removal efficiency. The value of the pressure applied to the fabric is not particularly restricted, but the color removal efficiency will tend to be further increased with a pressure of 20 $gf/cm^2$ to 1000 $gf/cm^2$, for example. The pressure is preferably 50 $gf/cm^2$ to 500 $gf/cm^2$ and more preferably 50 $gf/cm^2$ to 450 $gf/cm^2$. The means for applying pressure to the fabric is not particularly restricted, and a publicly known hot press machine may be employed.

2.3.4 Washing and Drying

After the contact and heating, the fabric may be subjected to an optional cooling step followed by washing to remove the color hazing or decoloring agent from the fabric, and then dried. For example, the contacted and heated fabric may be washed with water or immersed in a solvent to allow the color hazing or decoloring agent adhering to the fabric to be easily removed. In the method of the present disclosure, when the fabric is hazed, the disperse dye becomes fixed in the fabric while it is being washed, allowing the color hazing or decoloring agent to be removed preferentially.

3. Effect

As explained above, our approach allows disperse dye adhering to a fabric to be transferred and then refixed onto the fabric, or allows disperse dye adhering to a fabric to be transferred and then refixed onto a different material, both by a different mechanism than conventional discharge dyeing.

For example, with our approach, it is possible to transfer a fabric-adhered disperse dye in the in-plane direction and then to refix it to the fabric, or to transfer a disperse dye distributed only on one side of a fabric to the other side (that is, to transfer the disperse dye in a direction crossing with the in-plane direction of the fabric (including the thickness direction of the fabric)) and then to refix it to the fabric, or to transfer a fabric-adhered disperse dye for color removal from the fabric. It is thus possible to easily haze or decolor, or to alter, patterns that have been formed in fabrics using disperse dyes. We also allow a disperse dye in a fabric that has originally only been dyed on the front side, to be transferred so that the pattern is visible on the back side (hazing in the thickness direction of the fabric). A fabric that has been hazed or decolored by the technology of the present disclosure can then easily be printed with a different pictorial pattern.

Moreover, we use compounds that are relatively safe and environmentally friendly, does not require the use of large amounts of water during color hazing or decoloring, and is less likely to emit VOCs or hazardous substances during color hazing or decoloring. We therefore allow construction of upcycling systems designed with the environment in mind.

Grade 5: The original pattern was hazed and indistinguishable.
Grade 4: Parts of the original pattern remained, but most was hazed and virtually indistinguishable.
Grade 3: The original pattern was partially transferred or disappeared, making the original pattern difficult to distinguish.
Grade 2: Slight bleeding had occurred in the original pattern, allowing the original pattern to be distinguished.
Grade 1: Only color tone change occurred, essentially without change in the pattern, allowing the original pattern to be easily distinguished.

TABLE 1

| | Example | | | | | | | | | | Comp. Example | | | | | | |
|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 |
| NEWSOLV RPDE | 100 | 50 | | | | | | | | | | | | | | | |
| Dimethyl maleate | | | 100 | | | | | | | | | | | | | | |
| Diethyl succinate | | | | 100 | | | | | | | | | | | | | |
| Dimethyl adipate | | | | | 100 | | | | | | | | | | | | |
| Ethyleneglycol diacetate | | | | | | 100 | | | | | | | | | | | |
| Dietheyleneglycol diacetate | | | | | | | 100 | | | | | | | | | | |
| Ethyleneglycol monoacetate | | | | | | | | 100 | | | | | | | | | |
| Propylene glycol | | | | | | | | | 100 | | | | | | | | |
| Tripropylene glycol | | | | | | | | | | 100 | | | | | | | |
| Adipic acid | | | | | | | | | | | 100 | | | | | | |
| Butanediol | | | | | | | | | | | | 100 | | | | | |
| Ethyleneglycol monoethyl ether acetate | | | | | | | | | | | | | 100 | | | | |
| Diethyleneglycol dibenzoate | | | | | | | | | | | | | | 100 | | | |
| Sorbitan monoolcate | | | | | | | | | | | | | | | 100 | | |
| Serbitan POE(20) trioleate | | | | | | | | | | | | | | | | 100 | |
| PLURONIC TR-704 | | | | | | | | | | | | | | | | | 100 |
| Degree of hazing effect | 5 | 4 | 5 | 4-5 | 5 | 4 | 4-5 | 5 | 4-5 | 3-4 | 2 | 2 | 0 | 3 | 1 | 1 | 0 |

In Table 1, "NEWSOLV RPDE" is a mixture of 63 mass % dimethyl glutarate, 24 mass % dimethyl succinate and 13 mass % dimethyl adipate (product of Nicca Chemical Co., Ltd.). In the same table, "PLURONIC TR-704" is a polyoxyethylene-polyoxypropylene block copolymer of ethylenediamine (Adeka Corp.).

A degree of hazing effect of "3-4" in Table 1 means between grade 3 and grade 4, and the same "4-5" means between grade 4 and grade 5.

As shown in Table 1, Examples 1 to 10 all had hazing effect degrees of higher than grade 3, and hazing of the patterns formed in the fabrics successfully made it difficult to distinguish the original patterns. With Comparative Examples 1 to 3 and 5 to 7, on the other hand, some discharge dyeing was possible but no hazing effect was found. The degree of the hazing effect in Comparative Example 4 was judged to be "3", but this was because the fabric as a whole was decolored (discharge dyed) resulting in a thin pattern and making it difficult to distinguish the original pattern, which could not be considered to be proper hazing.

EXAMPLES

Our agents and methods will now be described in greater detail using Examples, with the understanding that these Examples are not intended to be limiting in any way.

1. Color Hazing

A polyester print fabric printed with a disperse dye was contacted with a specific dropped compound and the fabric was then sandwiched between aluminum foils and pressed against an iron while heating at 180° C. for 2 minutes, after which it was washed and dried. The type of dropped compound and the drip volume (% o.w.f) of each compound onto the fabric are shown in Table 1.

The dried fabric was visually observed and the degree of hazing effect was evaluated on the following 5-level scale. FIG. 1 shows an example of a scale for assessing the degree of hazing effect. A hazing effect evaluation of grade 3 or higher can be considered a high hazing effect. The evaluation results are shown in Table 1.

2. Decoloring

Figure 2:
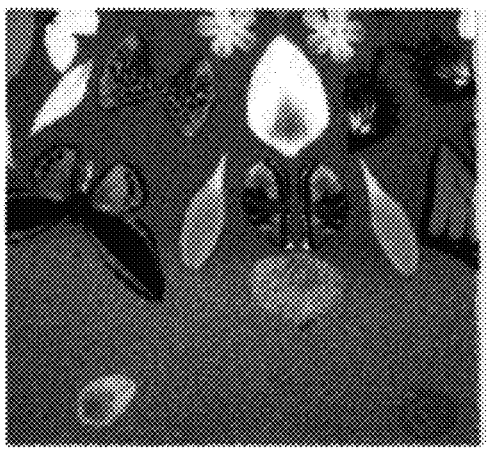
FIG. 2 shows an example of the state of a fabric before and after decoloring.
Figure 2:

NEWSOLV RPDE was dropped at 100% o.w.f. onto a polyester knit sublimation transfer fabric, a sheet (qualitative filter paper No. 2) with a size matching the fabric was placed over it, and heat treatment was carried out for 1 minute at 180° C. while pressing at 400 gf/cm$^2$ with a hot press machine (Pony50, Japan Polymark Co., Ltd.). After removing the filter paper, NEWSOLV RPDE was again dropped onto the fabric and fresh filter paper was placed over it for the same treatment repeated two more times, for color removal of the fabric. The fabric after decoloring was washed with acetone and dried, and the state of disperse dye remaining in the fabric was observed. FIG. 2 shows an example of the state of a fabric before and after decoloring. As shown in FIG. 2, virtually none of the disperse dye remained in the fabric after decoloring, with a white polyester knit being obtained by the decoloring procedure.

The decoloring effect was also confirmed using dimethyl maleate, dimethyl succinate, dimethyl adipate, ethyleneglycol diacetate, diethyleneglycol diacetate, ethyleneglycol monoacetate, propylene glycol or tripropylene glycol instead of NEWSOLV RPDE. The decoloring effect was greatly diminished when using adipic acid, butanediol, ethyleneglycol monoethyl ether acetate, diethyleneglycol dibenzoate, sorbitan monooleate, sorbitan POE(20) trioleate or PLURONIC TR-704 instead of NEWSOLV RPDE. In other words, the color removal effect was superior with a more excellent hazing effect as in Examples 1 to 10.

3. Summary

Based on the results shown for Examples 1 to 5, a high color hazing or decoloring effect may be expected when using compounds represented by general formula (1)

In general formula (1), X is an alkylene or alkenylene group of 2 to 4 carbon atoms, $R^1$ is an alkyl group of 1 to 4 carbon atoms and $R^2$ is an alkyl group of 1 to 4 carbon atoms.

Based on the results shown for Examples 6 to 10, a high color hazing or decoloring effect may also be expected when using compounds represented by general formula (2)

In general formula (2), AO is an alkyleneoxy group of 2 to 3 carbon atoms, n is an integer of 1 to 3, $Y^1$ is a hydrogen atom or an $R^3CO$ group, $R^3$ is an alkyl group of 1 to 4 carbon atoms, $Y^2$ is a hydrogen atom or an $R^4CO$ group, and $R^4$ is an alkyl group of 1 to 4 carbon atoms.

The Examples described above used polyester print fabrics, but the type of fabric to be used is not limited to polyester. The color hazing or decoloring effect of the compounds mentioned above can be expected with any fabric that can be printed or dyed with a disperse dye.

The Examples described above used solvents composed of the aforementioned compounds alone dropped onto the fabrics. However, other components may also be included in the solvents in addition to the compounds. Means and methods other than dropping may also be used for contact of the compounds with fabrics.

Moreover, although the Examples described heating with an iron or hot press machine, the heating means is not limited to these and may be any other type of heating means or method. The heating temperature and heating time may also be adjusted as appropriate for the desired degree of color hazing or decoloring.

The invention claimed is:

1. A method of color hazing or decoloring of a fabric, the method comprising:
providing a fabric printed or dyed with a disperse dye;
contacting the fabric with a color hazing or decoloring agent, wherein
the color hazing or decoloring agent comprising at least one compound selected from the group consisting of compounds represented by general formula (1) and compounds represented by general formula (2):

wherein,
in general formula (1), X is an alkylene or alkenylene group of 2 to 4 carbon atoms, $R^1$ is an alkyl group of 1 to 4 carbon atoms and $R^2$ is an alkyl group of 1 to 4 carbon atoms, and
in general formula (2), AO is an alkyleneoxy group of 2 to 3 carbon atoms, n is an integer of 1 to 3, $Y^1$ is a hydrogen atom or an $R^3CO$ group, $R^3$ is an alkyl group of 1 to 4 carbon atoms, $Y^2$ is a hydrogen atom or an $R^4CO$ group, and $R^4$ is an alkyl group of 1 to 4 carbon atoms.

2. The method of color hazing or decoloring according to claim 1,
wherein the compounds represented by general formula (2) are one or more compounds selected from the group consisting of compounds represented by general formula (2-1) and compounds represented by general formula (2-2):

wherein,
in general formula (2-1), EO is an ethyleneoxy group, and
in general formula (2-2), PO is a propyleneoxy group.

3. The method of color hazing or decoloring according to claim 1, wherein $R^1$ is an alkyl group of 1 or 2 carbon atoms, and $R^2$ is an alkyl group of 1 or 2 carbon atoms.

4. The method of color hazing or decoloring according to claim 1, wherein X is an alkylene group of 2 to 4 carbon atoms.

5. The method of color hazing or decoloring according to claim 3, wherein X is an alkylene group of 2 to 4 carbon atoms.

6. A method of producing a fabric, the method comprising carrying out color hazing or decoloring of a fabric printed or dyed with a disperse dye, by heating the fabric while contacting with a color hazing or decoloring, wherein
the color hazing or decoloring comprises at least one compound selected from the group consisting of compounds represented by general formula (1) and compounds represented by general formula (2):

wherein,
in general formula (1), X is an alkylene or alkenylene group of 2 to 4 carbon atoms, $R^1$ is an alkyl group of 1 to 4 carbon atoms and $R^2$ is an alkyl group of 1 to 4 carbon atoms, and
in general formula (2), AO is an alkyleneoxy group of 2 to 3 carbon atoms, n is an integer of 1 to 3, $Y^1$ is a hydrogen atom or an $R^3CO$ group, $R^3$ is an alkyl group of 1 to 4 carbon atoms, $Y^2$ is a hydrogen atom or an $R^4CO$ group, and $R^4$ is an alkyl group of 1 to 4 carbon atoms.

7. The method according to claim 6, wherein
the compounds represented by general formula (2) are one or more compounds selected from the group consisting of compounds represented by general formula (2-1) and compounds represented by general formula (2-2):

wherein, in general formula (2-1), EO is an ethyleneoxy group, and in general formula (2-2), PO is a propyleneoxy group.

8. The method according to claim 6, wherein $R^1$ is an alkyl group of 1 or 2 carbon atoms, and $R^2$ is an alkyl group of 1 or 2 carbon atoms.

9. The method according to claim 6, wherein

X is an alkylene group of 2 to 4 carbon atoms.

10. The method according to claim 8, wherein

X is an alkylene group of 2 to 4 carbon atoms.

11. The method according to claim 6, further comprising:

when the fabric is heated while being contacted with the color hazing or decoloring agent, contacting an object to which the disperse dye is adherable with the fabric while pressure is applied to the fabric.

12. The method according to claim 11, wherein the pressure applied to the fabric is 20 $gf/cm^2$ to 1000 $gf/cm^2$.

13. The method according to claim 6, wherein heating temperature is 120° C. to 220° C. and heating time at the heating temperature is 30 seconds to 10 minutes.

14. The method of color hazing or decoloring according to claim 1, wherein in general formula (2), $Y^1$ is an $R^3CO$ group.

15. The method according to claim 6, wherein in general formula (2), $Y^1$ is an $R^3CO$ group.

* * * * *